United States Patent
Song et al.

(10) Patent No.: US 11,038,639 B1
(45) Date of Patent: Jun. 15, 2021

(54) PERFORMING MU-MIMO BASED ON BANDWIDTH PARTS

(71) Applicant: Sprint Spectrum LP, Overland Park, KS (US)

(72) Inventors: Minho Song, Ashburn, VA (US); Hung Viet Bui, Chantilly, VA (US); Amitkumar Patel, Reston, VA (US); Asghar Hasan, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 21 days.

(21) Appl. No.: 16/656,644

(22) Filed: Oct. 18, 2019

(51) Int. Cl.
| | |
|---|---|
| *H04W 88/08* | (2009.01) |
| *H04L 5/00* | (2006.01) |
| *H04W 24/10* | (2009.01) |
| *H04B 7/0452* | (2017.01) |
| *H04W 72/04* | (2009.01) |
| *H04B 17/309* | (2015.01) |

(52) U.S. Cl.
CPC .......... *H04L 5/0035* (2013.01); *H04B 7/0452* (2013.01); *H04B 17/309* (2015.01); *H04L 5/0037* (2013.01); *H04W 24/10* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,731,599 B2 | 5/2014 | Wei | |
| 9,743,258 B1* | 8/2017 | Elsherif | H04W 24/02 |
| 10,070,454 B2 | 9/2018 | Elsherif et al. | |
| 2007/0259681 A1* | 11/2007 | Cheng | H04L 27/2608 455/522 |
| 2011/0306384 A1* | 12/2011 | Wei | H04W 52/248 455/522 |
| 2013/0182665 A1* | 7/2013 | Venkatraman | H04B 7/0452 370/329 |
| 2015/0085761 A1* | 3/2015 | Maltsev | H04W 52/06 370/329 |
| 2016/0088648 A1* | 3/2016 | Xue | H04L 1/0026 370/252 |
| 2016/0345343 A1* | 11/2016 | Elsherif | H04W 72/1289 |
| 2017/0019863 A1* | 1/2017 | Cariou | H04W 52/146 |
| 2017/0070961 A1* | 3/2017 | Bharadwaj | H04L 5/0053 |
| 2017/0373789 A1* | 12/2017 | Huang | H04B 7/0452 |
| 2019/0090200 A1* | 3/2019 | Alpert | H04W 52/241 |
| 2019/0090209 A1* | 3/2019 | Zoltan | H04B 7/15535 |
| 2019/0215807 A1* | 7/2019 | Hwang | H04L 27/2602 |
| 2020/0336920 A1* | 10/2020 | Li | H04W 16/28 |

\* cited by examiner

*Primary Examiner* — Sithu Ko (57) ABSTRACT

Performing MU-MIMO based on bandwidth parts includes identifying a plurality of wireless devices attached to an access node, wherein each wireless device utilizes a different BWP, and wherein wireless devices using larger BWPs are located closer to the access node than wireless devices using smaller BWPs, and forming a MU-MIMO group comprising the plurality of wireless devices, while maintaining a uniform power spectral density by virtue of the differently-sized BWPs.

17 Claims, 5 Drawing Sheets

PERFORMING MU-MIMO BASED ON BANDWIDTH PARTS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a multi-user (MU-MIMO) mode, in which multiple data streams can be directed towards a plurality of wireless devices that are selected to participate in the MU-MIMO operating mode based on the orthogonality of transmission, thereby maximizing resources. Further, Massive MIMO (mMIMO) extends this concept to antenna arrays coupled to these base stations, the antenna arrays comprising large numbers of controllable antenna elements that enable directing several MIMO streams to various groups or "pairings" of wireless devices. mMIMO has been identified as one of the promising air interface technologies to address the capacity requirement required demanded by 5G networks.

Further, 5G networks are capable of deploying wireless air interfaces with bandwidth parts (BWPs) that include contiguous blocks of resources, each contiguous block being configured with its own numerology and subcarrier spacing. For example, different BWPs can be configured for different types of signals (such as narrowband internet-of-things, wideband voice or data, etc.) or for wireless devices having different application requirements (such as voice over IP, gaming, streaming, etc.). Thus, certain wireless devices with lower bandwidth requirements (such as narrowband/IoT) devices can be assigned BWPs that consume fewer air interface resources, including frequency However, MU-MIMO suffers from some issues related to coverage area of an access node. For example, while MU-MIMO allows scheduling wireless devices using the same frequency and time resources to access multiple streams (i.e. "layers"), the coverage of such layers is reduced as the distance from an access node increases. In other words, wireless devices farther away from an access node are less likely to be paired with other wireless devices, even if they meet MU-MIMO criteria (such as orthogonality, etc.), because the signal strength experienced by such distant wireless devices is too low to be able to receive multiple layers of MU-MIMO transmissions. In addition, the transmit power utilized by antenna elements for each MU-MIMO layer generally remains constant, which compounds the signal problems for the distant wireless devices, resulting in sub-optimal MU-MIMO pairing. Meanwhile, increasing the power for different layers or for distant wireless devices (as is performed in the current state of the art) expends additional resources at the base station, and can cause interference for other wireless devices and network nodes within the coverage area of the access node.

OVERVIEW

Exemplary embodiments described herein include methods, systems, and processing nodes for performing MU-MIMO based on BWPs utilized by wireless devices. An exemplary method for performing MU-MIMO based on BWPs includes identifying a first wireless device attached to an access node, the first wireless device being located greater than a first distance away from the access node and utilizing a BWP below a first threshold BWP size, identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size, and responsive to identifying the first and second wireless devices, adding the first and second wireless devices into a MU-MIMO group.

An exemplary system for performing MU-MIMO based on BWPs includes a processing node, and a processor coupled to the processing node. The processor can be configured to perform operations including identifying a plurality of wireless devices attached to an access node, wherein each wireless device utilizes a different BWP, and wherein wireless devices using larger BWPs are located closer to the access node than wireless devices using smaller BWPs, and forming a MU-MIMO group comprising the plurality of wireless devices.

An exemplary processing node for performing MU-MIMO based on BWPs is configured to perform operations including identifying a first wireless device attached to an access node, the first wireless device being located greater than a first distance away from the access node and utilizing a BWP below a first threshold BWP size, identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size, determining that both first and second wireless devices are eligible to be in the same MU-MIMO group, and responsive to identifying the first and second wireless devices and determining eligibility, adding the first and second wireless devices into a MU-MIMO group.

DETAILED DESCRIPTION

In embodiments disclosed herein, a wireless network is configured to form MU-MIMO groups or pairings comprising wireless devices that are identified as utilizing different bandwidth part sizes and are located at different distances from a serving access node. For example, a first wireless device near a cell edge and utilizing a small BWP is paired with a second wireless device near a cell center and utilizing a large BWP. The distances of the wireless devices are determined based on a path loss measurement report, such as channel quality indicator (CQI), reference signal receive power (RSRP), signal to interference plus noise ratio (SINR), etc. Based on the path loss measurement reports, and the BWP size utilized by each wireless device, the wireless devices can be paired into MU-MIMO groups. Since a transmit power (of an antenna transmitting the MU-MIMO stream) generally stays constant for each orthogonal stream (or layer), a power spectral density (PSD) is also constant for identical BWPs from the perspective of the transmitting antenna. Whereas, from the perspective of wireless devices, the PSD may become lower as the distance of the wireless device from the transmitting antenna increases. Further, wireless devices utilizing small BWPs do not suffer excessive signal losses, since as the PSD is also a function of a size of the BWP, the PSD is increased for smaller bandwidths. Thus, such wireless devices utilizing small BWPs and located towards a cell edge can be paired with other wireless devices that are closer to the access node and utilizing a wider BWP, since the PSD of these other wireless devices is similar due to the wider bandwidth. These and additional operations are further described with respect to the embodiments depicted in FIGS. 1-6 below.

Figure 1:
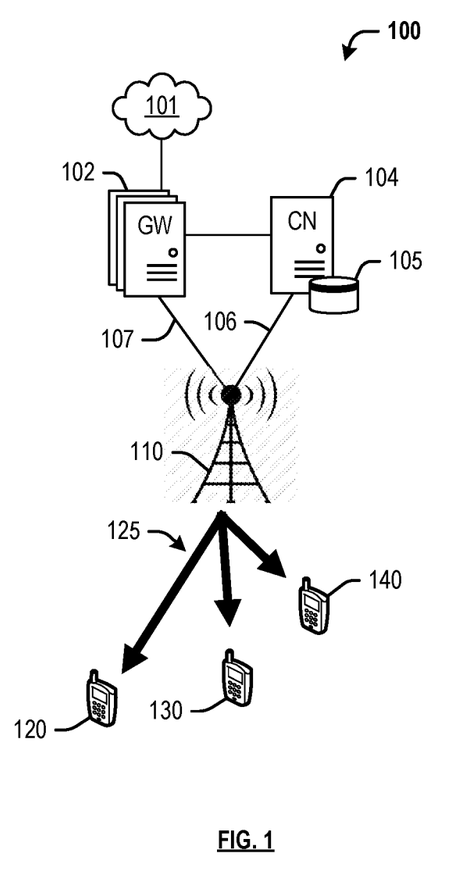
FIG. 1 depicts an exemplary system for performing MU-MIMO based on BWPs.

FIG. 1 depicts an exemplary system 100 for performing MU-MIMO in a wireless network. System 100 comprises a communication network 101, gateway node(s) 102, controller node 104, access node 110, and wireless devices 120, 130, 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can implement various transmission modes or operating modes within its coverage area, including multiple-input-multiple-output (MIMO), single user MIMO (SU-MIMO), multi-user MIMO (MU-MIMO), beamforming, etc. In an exemplary embodiment, access node 110 may utilize hundreds of antennae to simultaneously transmit each of a plurality of different data streams (such as MU-MIMO data stream 125) to a corresponding plurality of wireless devices (such as wireless devices 120, 130, 140). In other words, wireless devices 120, 130, 140 may be participating in a MU-MIMO group (or pairing). Qualifying for MU-MIMO may be based on, for instance, an orthogonality of transmission, so as to maximize resources of a loaded access node. In other words, one or more criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130, 140 based on channel feedback received from said wireless devices including RI, CQI, and PMI. CRS' are not pre-coded signals and are used by wireless devices 120, 130, 140 for channel estimation. To fully exploit MU-MIMO mode, data/spatial streams intended to/from access node 110 and/or wireless devices 120, 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

Further, access node 110 (or any other entity within system 100) may be configured to execute a method including identifying a first wireless device attached to access node 110, the first wireless device being located greater than a first distance away from the access node 110 and utilizing a BWP below a first threshold BWP size. For example, the first wireless device can include wireless device 120. Further, the method includes identifying a second wireless device attached to the access node 110, the second wireless device being located less than a second distance away from the access node and utilizing a BWP greater than a second threshold BWP size. The second distance is shorter than the first distance and the second threshold BWP size is greater than the first threshold BWP size. For example, the second wireless device can include wireless device 140. Responsive to identifying the first and second wireless devices 120, 140, the method includes adding the first and second wireless devices into a MU-MIMO group, enabling wireless devices 120, 140 to receive MU-MIMO stream 125.

Identifying the first and second wireless devices 120, 140 comprises respectively receiving a signal measurement report from each wireless device 120, 140, and respectively determining a distance of each wireless device 120, 140 from the access node 110 based in part on the signal measurement report received from each wireless device. The signal measurement report can include a pathloss measurement, which can be indicated via a channel quality indicator (CQI), reference signal receive power (RSRP), signal to interference plus noise ratio (SINR), etc. In an exemplary embodiment, a distance need not be computed, but is merely inferred based on the pathloss measurement. For example, the wireless devices 120 and 140 are identified and grouped into a MU-MIMO pairing based on the signal measurement and the bandwidth part size utilized by each wireless device 120, 140.

In an exemplary embodiment, first threshold BWP size (utilized by wireless device 120) includes any one of 1 MHz, 2 MHz, 5 MHz, 10 MHz, and 20 MHz, and the second threshold BWP size (utilized by wireless device 140) comprises any one of 2 MHz, 5 MHz, 10 MHz, 20 MHz, and 30 MHz, with the second threshold BWP size being greater than the first threshold BWP size. In other words, if wireless device 120 is configured to utilize a 1 MHz BWP, wireless device 140 can be configured to utilize any of 2 MHz, 5 MHz, 10 MHz, 20 MHz, and so on. Whereas, if wireless device 120 is configured to utilize a 10 MHz BWP, wireless device 140 can be configured to utilize any of 20 MHz, 30 MHz, 40 MHz, etc. Aside from satisfying the pairing eligibility criteria, such orthogonality (based on an average signal separation), a size of the sector, an angle of arrival (of, for example, a reference signal), etc., the selection of wireless devices 120, 140 into a MU-MIMO group is based on the BWP size used by each wireless device, and a distance from the access node (as related to the pathloss measurement mentioned above).

Further, the method can include identifying a third wireless device attached to the access node 110, the third wireless device being located a third distance away from the access node 110, the third distance being in between the first and second distances, the third wireless device utilizing a BWP that has a size in between the first and second threshold BWP sizes. For example, the third wireless device can include wireless device 130. Based on identifying the BWP size and location of wireless device 130, wireless device 130 can be added into the MU-MIMO group comprising wireless devices 120, 140. For example, if the first wireless device 120 utilizes a BWP of 1 MHz and the second wireless device 140 utilizes a BWP of 10 MHz, the third wireless device may be utilizing a BWP of 5 MHz. Further, while a power spectral density (PSD) level for each BWP is different from the perspective of access node 110 (or transmitting antennae thereof), the PSD level for each wireless device 120, 130, 140 is effectively equalized, as a function of the location of each wireless device 120, 130, 140, as well as a BWP size utilized by each wireless device. In other words, wireless device 120 utilizing a smaller BWP further away from access node 110 ends up with a similar PSD level as wireless device 140 utilizing a larger BWP closer to access node 110, which renders each wireless device 120, 140 suitable candidates for pairing.

Further, a performance of the MU-MIMO groups can be monitored, and adjustments can be made to the MU-MIMO groups performed based on the performance. Generally, the performance can be based on one or more of a size of each MU-MIMO group comprising the eligible wireless devices or a quantity of eligible wireless devices participating in the MU-MIMO groups. In an exemplary embodiment, a performance of MU-MIMO can further include a throughput of each of the one or more MU-MIMO groups in the sector, an average throughput of each MU-MIMO group or each wireless device in each MU-MIMO group, or an aggregate throughput (i.e. total throughput) of all MU-MIMO signals within the sector, as well as how many wireless devices within the sector meet an orthogonality threshold, a number of successful pairings, historical trends of the signal characteristics, and so on. For example, the historical trends may be monitored and recorded at time intervals, and the pairing efficiency metric based on the recorded historical trends. Thus, at certain time intervals, the pairing efficiency metric is monitored when adjusting the maximum number of MU-MIMO wireless devices. Generally, the performance tracks how successfully and efficiently the MU-MIMO groups are utilizing the available resources.

Thus, system 100 comprises components (such as processing nodes, access nodes, etc.) configured to identify a plurality of wireless devices, wherein each wireless device utilizes a different BWP, and wherein wireless devices using larger BWPs are located closer to the access node 110 than wireless devices using smaller BWPs, and to form MU-MIMO groups comprising the plurality of wireless devices. In an exemplary embodiment, the processing node is communicatively coupled to the access node 110. For example, the processing node is housed within the access node 110 within, for instance, a scheduling module.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to MU-MIMO performance related to access node 110 and wireless devices 120, 130, 140, selected BWP sizes and identifiers, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
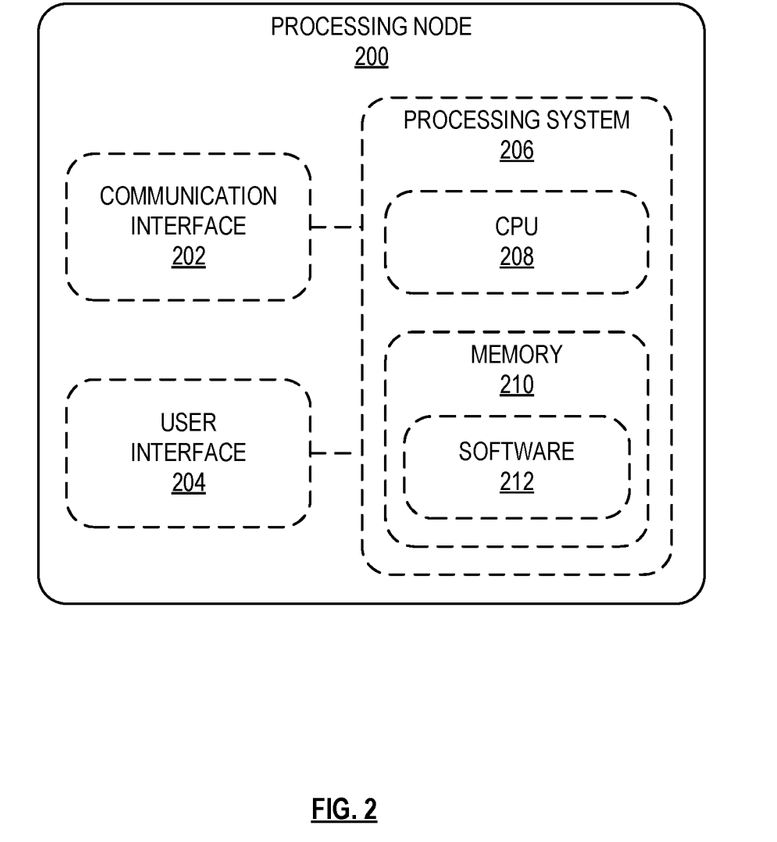
FIG. 2 depicts an exemplary processing node for performing MU-MIMO based on BWPs.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 includes logic for identifying a first wireless device attached to an access node, the first wireless device being located greater than a first distance away from the access node and utilizing a BWP below a first threshold BWP size, identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size, and responsive to identifying the first and second wireless devices, adding the first and second wireless devices into a MU-MIMO group.

In another exemplary embodiment, software 210 includes logic for identifying a plurality of wireless devices attached to an access node, wherein each wireless device utilizes a different BWP, and wherein wireless devices using larger BWPs are located closer to the access node than wireless devices using smaller BWPs, and forming a MU-MIMO group comprising the plurality of wireless devices.

In another exemplary embodiment, software 210 includes logic for identifying a first wireless device attached to an access node, the first wireless device being located greater than a first distance away from the access node and utilizing a BWP below a first threshold BWP size, identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size, determining that both first and second wireless devices are eligible to be in the same MU-MIMO group, and responsive to identifying the first and second wireless devices and determining eligibility, adding the first and second wireless devices into a MU-MIMO group.

Figure 3:
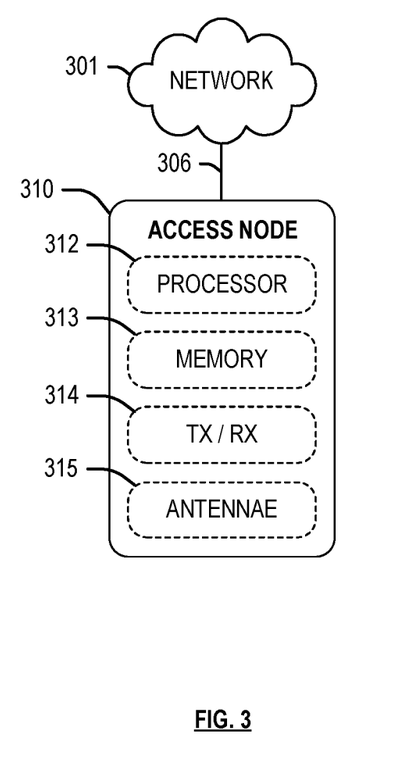
FIG. 3 depicts an exemplary access node for performing MU-MIMO based on BWPs.

FIG. 3 depicts an exemplary access node 310 for performing MU-MIMO based on BWPs. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors. Further, in each sector, the antennae 315 may be configured to operate in various operating modes (or transmit data in various transmission mode), such as SU-MIMO, MU-MIMO, beamforming, etc. Similarly, transceivers 314 include a plurality of transceivers that can deploy MU-MIMO or massive MIMO data streams to end-user wireless devices, as well as to facilitate communication with other network nodes on network 301. Further, access node 310 is communicatively coupled to network 301 via communication interface 306, which may be any wired or wireless link as described above.

In an exemplary embodiment, memory 313 includes logic for identifying a first wireless device attached to access node 310, the first wireless device being located greater than a first distance away from the access node 310 and utilizing a BWP below a first threshold BWP size, identifying a second wireless device attached to the access node 310, the second wireless device being located less than a second distance away from the access node 310 and utilizing a BWP greater than a second threshold BWP size, wherein the second distance is shorter than the first distance and the second threshold BWP size is greater than the first threshold BWP size, and responsive to identifying the first and second wireless devices, adding the first and second wireless devices into a MU-MIMO group.

In another exemplary embodiment, memory 313 includes logic for identifying a plurality of wireless devices attached to access node 310, wherein each wireless device utilizes a different BWP, and wherein wireless devices using larger BWPs are located closer to the access node 310 than wireless devices using smaller BWPs, and forming a MU-MIMO group comprising the plurality of wireless devices.

In another exemplary embodiment, memory 313 includes logic for identifying a first wireless device attached to access node 310, the first wireless device being located greater than a first distance away from the access node 310 and utilizing a BWP below a first threshold BWP size, identifying a second wireless device attached to the access node 310, the second wireless device being located less than a second distance away from the access node 310 and utilizing a BWP greater than a second threshold BWP size, wherein the second distance is shorter than the first distance and the second threshold BWP size is greater than the first threshold BWP size, determining that both first and second wireless devices are eligible to be in the same MU-MIMO group, and responsive to identifying the first and second wireless devices and determining eligibility, adding the first and second wireless devices into a MU-MIMO group.

Figure 4:
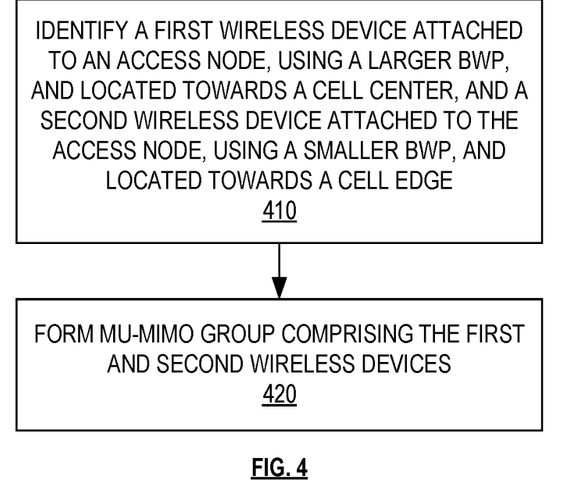
FIG. 4 depicts an exemplary method for performing MU-MIMO based on BWPs.

FIG. 4 depicts an exemplary method for performing MU-MIMO based on BWPs. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a first wireless device is identified as being attached to an access node, using a larger BWP, and located towards a cell center, while a second wireless device is identified as being attached to the access node, using a smaller BWP, and located towards a cell edge. For the purposes of this embodiment, the terms "larger" and "smaller" refer to sizes of each BWP used by each wireless device relative to each other. For example, if the first wireless device is configured to utilize a 1 MHz BWP, the second wireless device can be configured to utilize any of 2 MHz, 5 MHz, 10 MHz, 20 MHz, and so on. Whereas, if the first wireless device is configured to utilize a 10 MHz BWP, the second wireless device can be configured to utilize any of 20 MHz, 30 MHz, 40 MHz, etc.

Further, identifying the first and second wireless devices comprises respectively receiving a signal measurement report from each wireless device, and respectively determining a distance of each wireless device from the access node based in part on the signal measurement report received from each wireless device. The signal measurement report can include a pathloss measurement, which can be indicated via a channel quality indicator (CQI), reference signal receive power (RSRP), signal to interference plus noise ratio (SINR), etc. In an exemplary embodiment, a distance need not be computed, but is merely inferred based on the pathloss measurement.

Thus, at 420, the wireless devices are identified and grouped into a MU-MIMO pairing based on the signal measurement and the bandwidth part size utilized by each wireless device. Since a transmit power (of an antenna transmitting the MU-MIMO stream) generally stays constant for each orthogonal stream (or layer), a power spectral density (PSD) is also constant for identical BWPs from the perspective of the transmitting antenna. Whereas, from the perspective of wireless devices, the PSD may become lower as the distance of the wireless device from the transmitting antenna increases. Further, wireless devices utilizing small BWPs do not suffer excessive signal losses, since as the PSD is also a function of a size of the BWP, the PSD is increased for smaller bandwidths. Thus, such wireless devices utilizing small BWPs and located towards a cell edge can be paired with other wireless devices that are closer to the access node and utilizing a wider BWP, since the PSD of these other wireless devices is similar due to the wider bandwidth.

Figure 5:
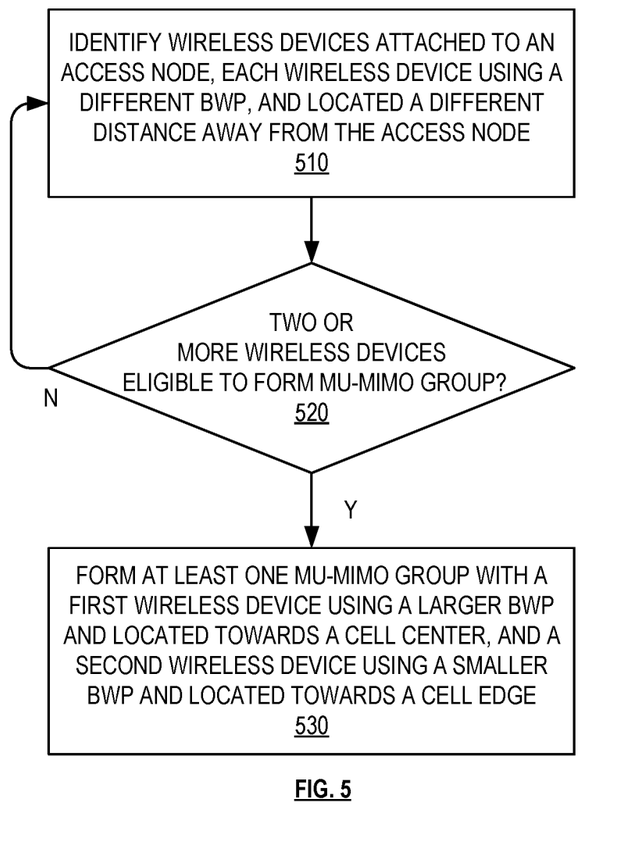
FIG. 5 depicts another exemplary method for performing MU-MIMO based on BWPs.

FIG. 5 depicts another exemplary method for performing MU-MIMO based on BWPs. The method of FIG. 5 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, wireless devices attached to an access node are identified, with each wireless device utilizing a different BWP, and being located a different distance away from the access node. For example, different wireless devices may have different requirements based on an application type, such as VoIP, streaming, IoT, etc., and may request attaching to different BWPs provided or deployed by the access node. Further, identifying the first and second wireless devices comprises respectively receiving a signal measurement report from each wireless device, and respectively determining a distance of each wireless device from the access node based in part on the signal measurement report received from each wireless device. The signal measurement report can include a pathloss measurement, which can be indicated via a channel quality indicator (CQI), reference signal receive power (RSRP), signal to interference plus noise ratio (SINR), etc. In an exemplary embodiment, a distance need not be computed, but is merely inferred based on the pathloss measurement.

Subsequently, at 520, two or more wireless devices are identified as being eligible to join a MU-MIMO group. For example, one or more criteria for pairing wireless devices for MU-MIMO (or including the wireless devices into an existing MU-MIMO group) include a channel orthogonality above a set threshold, a SINR above a threshold, etc. If, at 520, two or more wireless devices are eligible to form a MU-MIMO group, then the MU-MIMO group is formed only with a first wireless device being identified as using a larger BWP, and located towards a cell center, and a second wireless device is identified as using a smaller BWP, and located towards a cell edge. For the purposes of this embodiment, the terms "larger" and "smaller" refer to sizes of each BWP used by each wireless device relative to each other. For example, if the first wireless device is configured to utilize a 1 MHz BWP, the second wireless device can be configured to utilize any of 2 MHz, 5 MHz, 10 MHz, 20 MHz, and so on. Whereas, if the first wireless device is configured to utilize a 10 MHz BWP, the second wireless device can be configured to utilize any of 20 MHz, 30 MHz, 40 MHz, etc. Since a transmit power (of an antenna transmitting the MU-MIMO stream) generally stays constant for each orthogonal stream (or layer), a power spectral density (PSD) is also constant for identical BWPs from the perspective of the transmitting antenna. Whereas, from the perspective of wireless devices, the PSD may become lower as the distance of the wireless device from the transmitting antenna increases. Further, wireless devices utilizing small BWPs do not suffer excessive signal losses, since as the PSD is also a function of a size of the BWP, the PSD is increased for smaller bandwidths. Thus, such wireless devices utilizing small BWPs and located towards a cell edge can be paired with other wireless devices that are closer to the access node and utilizing a wider BWP, since the PSD of these other wireless devices is similar due to the wider bandwidth.

Figure 6:
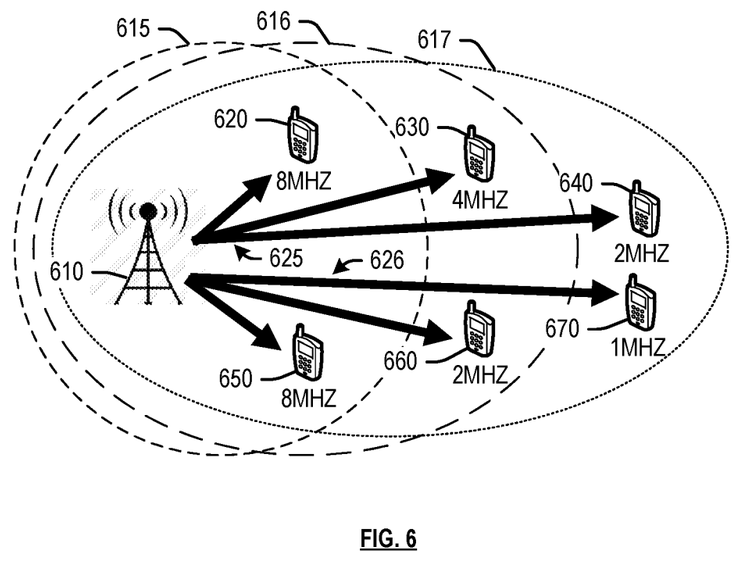
FIG. 6 depicts exemplary formation of MU-MIMO groups based on BWPs.

FIG. 6 depicts exemplary formation of MU-MIMO groups based on BWPs. Access node 810 is similar to access nodes 110 and 310, and is configured to deploy MU-MIMO data streams over a coverage area that may be defined using three thresholds: 615, 616, and 617. For example, wireless devices 620 and 650 within a distance threshold 615 can generally avail of more MU-MIMO streams or layers, while wireless devices 630 and 660 that are located between thresholds 615 and 616 can avail of fewer layers, while wireless devices 640 and 670 that are located outside threshold 616 can avail of a minimum number of layers, with any wireless device outside threshold 617 being unable to receive MU-MIMO streams from access node 610. Further, wireless devices 620 and 650 are illustrated as utilizing a BWP with a size of 8 MHz, wireless device 630 is illustrated as utilizing a BWP with a size of 4 MHz, wireless device 640 is illustrated as utilizing a BWP with a size of 2 MHz, wireless device 670 is illustrated as utilizing a BWP with a size of 1 MHz, and wireless device 660 is illustrated as utilizing a BWP with a size of 2 MHz.

As described herein, access node 610 is configured to form MU-MIMO groups or pairings comprising wireless devices that are identified as utilizing different bandwidth part sizes and are located at different distances from access node 610. For example, wireless device 640 near a cell edge (i.e. between thresholds 616 and 617) and utilizing a small BWP (i.e. 2 MHz) is paired with wireless device 630 in between thresholds 615 and 616 and utilizing a medium BWP of 4 MHz and with wireless device 620 within threshold 615 and utilizing a wider BWP of 8 MHz. Similarly, wireless device 670 near a cell edge (i.e. between thresholds 616 and 617) and utilizing a small BWP (i.e. 1 MHz) is paired with wireless device 660 in between thresholds 615 and 616 and utilizing a medium BWP of 2 MHz and with wireless device 650 within threshold 615 and utilizing a wider BWP of 8 MHz. The distances of the wireless devices are determined based on a path loss measurement report, such as channel quality indicator (CQI), reference signal receive power (RSRP), signal to interference plus noise ratio (SINR), etc. Based on the path loss measurement reports, and the BWP size utilized by each wireless device, the wireless devices can be paired into MU-MIMO groups. Further, the two separate groups (receiving separate MU-MIMO streams 625 and 626) are formed based on eligibility criteria.

Since a transmit power (of an antenna transmitting the MU-MIMO stream) generally stays constant for each orthogonal stream (or layer), a power spectral density (PSD) is also constant for identical BWPs from the perspective of the transmitting antenna. Whereas, from the perspective of wireless devices 640, 670, the PSD may become lower as the distance of the wireless device from the transmitting antenna increases. Further, wireless devices utilizing small BWPs do not suffer excessive signal losses, since as the PSD is also a function of a size of the BWP, the PSD is increased for smaller bandwidths. Thus, such wireless devices utilizing small BWPs and located towards a cell edge can be paired with other wireless devices 620, 650 that are closer to the access node and utilizing a wider BWP, since the PSD of these other wireless devices is similar due to the wider bandwidth.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing multi-user multiple input multiple output (MU-MIMO) based on bandwidth parts (BWPs), the method comprising:
   identifying a first wireless device attached to an access node, the first wireless device being located greater than a first distance away from the access node and utilizing a BWP below a first threshold BWP size;
   identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size;
   determining that both first and second wireless devices are eligible to be in a MU-MIMO group; and
   responsive to identifying the first and second wireless devices and determining eligibility, adding the first and second wireless devices into the MU-MIMO group.

2. The method of claim 1, wherein identifying the first and second wireless devices comprises respectively receiving a signal measurement report from each wireless device, and respectively determining a distance of each wireless device from the access node based in part on the signal measurement report received from each wireless device.

3. The method of claim 2, wherein the signal measurement report comprises a pathloss measurement.

4. The method of claim 1, wherein the first threshold BWP size comprises any one of 1 MHz, 2 MHz, 5 MHz, 10 MHz, and 20 MHz, and wherein the second threshold BWP size comprises any one of 2 MHz, 5 MHz, 10 MHz, 20 MHz, and 30 MHz.

5. The method of claim 1, further comprising:
   identifying a third wireless device attached to the access node, the third wireless device being located a third distance away from the access node, the third distance being in between the first and second distances, the third wireless device utilizing a BWP that has a size in between the first and second threshold BWP sizes; and
   adding the third wireless device into the MU-MIMO group.

6. The method of claim 1, wherein a power density level remains the same for both first and second wireless devices.

7. The method of claim 6, wherein the power density level comprises a function of a transmit power per MU-MIMO layer utilized by each wireless device, a size of the BWP utilized by each wireless device, and a distance of each wireless device from the access node.

8. A system for performing multi-user multiple input multiple output (MU-MIMO) based on bandwidth parts (BWPs), the system comprising:
   a processing node; and
   a processor coupled to the processing node, the processor being configured to perform operations comprising:
      identifying a first wireless device attached to an access node, the first wireless device being located greater than a first distance away from the access node and utilizing a BWP below a first threshold BWP size;
      identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size;
      determining that both first and second wireless devices are eligible to be in a MU-MIMO group; and
      responsive to identifying the first and second wireless devices and determining eligibility, adding the first and second wireless devices into the MU-MIMO group.

9. The system of claim 8, wherein the processing node is communicatively coupled to the access node.

10. The system of claim 9, wherein the processing node is housed within the access node.

11. The system of claim 8, wherein the plurality of wireless devices further comprises a third wireless device attached to the access node, the third wireless device being located a third distance away from the access node, the third distance being in between the first and second distances, the third wireless device utilizing a BWP that has a size in between the first and second threshold BWP sizes.

12. The system of claim 8, wherein the operations further comprise determining that both first and second wireless devices are eligible to be in the MU-MIMO group.

13. A processing node for performing multi-user multiple input multiple output (MU-MIMO) based on bandwidth parts (BWPs), the processing node being configured to perform operations comprising:
   identifying a first wireless device attached to an access node, the first wireless device being located greater than a first distance away from the access node and utilizing a BWP below a first threshold BWP size;
   identifying a second wireless device attached to the access node, the second wireless device being located less than a second distance away from the access node and utilizing a BWP greater than a second threshold BWP size, wherein the second distance is shorter than the first distance and the second threshold BWP size is greater than the first threshold BWP size;

determining that both first and second wireless devices are eligible to be in a MU-MIMO group; and responsive to identifying the first and second wireless devices and determining eligibility, adding the first and second wireless devices into the MU-MIMO group.

14. The processing node of claim 13, wherein identifying the first and second wireless devices comprises respectively receiving a signal measurement report from each wireless device, and respectively determining a distance of each wireless device from the access node based in part on the signal measurement report received from each wireless device.

15. The processing node of claim 14, wherein the signal measurement report comprises a pathloss measurement.

16. The processing node of claim 13, wherein a power density level remains the same for both first and second wireless devices.

17. The processing node of claim 16, wherein the power density level comprises a function of a transmit power per MU-MIMO layer utilized by each wireless device, a size of the BWP utilized by each wireless device, and a distance of each wireless device from the access node.

* * * * *